United States Patent Office 3,431,395
Patented Mar. 4, 1969

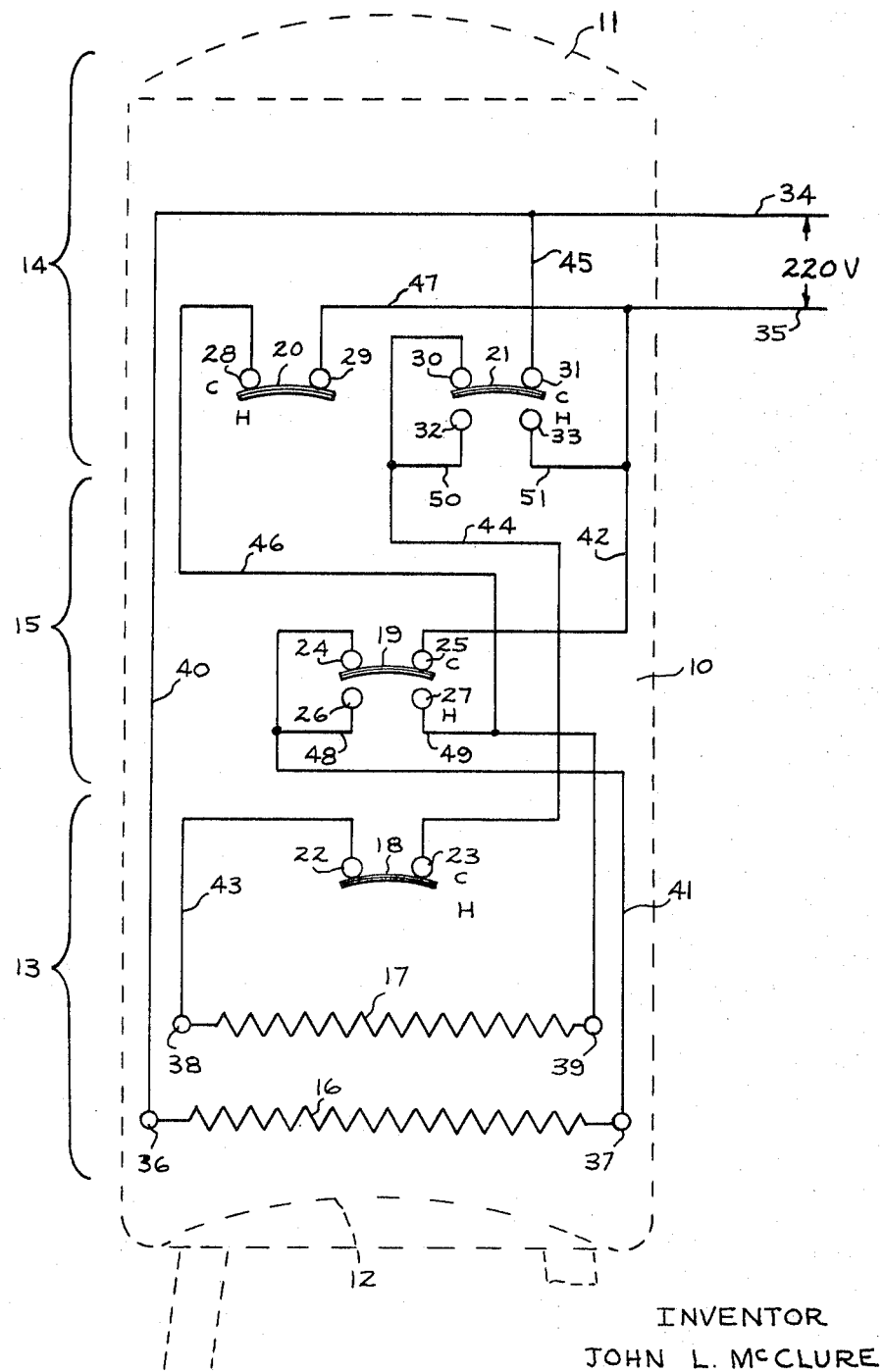

3,431,395
ELECTRIC WATER HEATER CIRCUIT
John L. McClure, Waukesha, Wis., assignor to General Electric Company, a corporation of New York
Filed Aug. 2, 1967, Ser. No. 657,855
U.S. Cl. 219—321 3 Claims
Int. Cl. H05b 3/78

ABSTRACT OF THE DISCLOSURE

Electric heater circuit means for a water tank having a lower water inlet portion, an upper water outlet portion and an intermediate portion. The circuit means include a pair of electrical resistance heating elements located in the tank lower portion and four thermostatic switching devices, one responsive to water temperature in each of the tank lower and intermediate portions and two responsive to water temperature in the tank upper portion. The electric heating elements are energized through the switching devices from a power supply which includes two lines. The arrangement is such that the switching devices function in response to water temperatures in the three tank portions to connect or disconnect the two heating elements across the power supply lines through various circuits.

Background of the invention

This invention relates to electric water heater circuit means. More particularly, it relates to electric water heater circuit means which provide rapid heat recovery as well as automatic flexibility of recovery.

In normal usage of an electric hot water heater, a draw-off of a large amount of hot water is only an occasional occurrence. Generally, only small amounts of hot water are drawn off from the heater. While it is obviously necessary to provide the heater with heating means capable of rapidly recovering the heat lost by a large draw-off of hot water, it is desirable that the full capacity of such heating means be employed only when necessary to avoid undue wear thereof. It is also desirable that operation of the heating means during both small and larger draw-off periods be automatic and that the control components employed to provide such automatic operation be of a type which can be economically provided and maintained.

Summary of the invention

The present invention provides improved electric heater circuit means for a water tank having a lower water inlet portion, an upper water outlet portion and an intermediate portion. This circuit means include a pair of electrical resistance heating elements located in the tank lower portion and four thermostatic switching devices, one responsive to the water temperature in each of the tank lower and intermediate portions and two responsive to water temperature in the tank upper portion. The electrical heating elements are energized through the switching devices from a power supply system which includes two lines. The arrangement of the circuit means is such that, when all three tank portions are filled with water below an approximately identical predetermined temperature as in the case of a large draw-off of hot water from the tank, the switching devices function to connect both of the heating elements in parallel across the power supply lines and the additive output of the two heating elements is employed to heat the water. When water temperature conditions in the tank are such that the water temperature in the tank upper portion is above the predetermined temperature and the water temperatures in the intermediate and lower tank portions are below the predetermined temperature as in the case of a medium draw-off, the switching devices operate to connect one of the heating elements across the power supply lines and to de-energize the other heating element. Thus, the heating capacity of only one heating element is employed giving heat input to the water which equals one-half of the input employed with both of the heating elements connected in parallel. When the water temperatures in both the upper and intermediate tank portions are above the predetermined temperature and only the water temperature in the tank lower portion is below the predetermined temperature as in the case of a small draw-off, the switching devices operate to connect the two heating elements in series across the power supply lines and the heat output of the series connected heating elements becomes equal to one-half of the output of one element alone or one-fourth of the output of the two elements connected in parallel. When the water temperatures in all three of the tank portions are above the predetermined temperature, the switching devices function to disconnect both of the heating elements from the power supply lines until such time as the demand for heat is required as a result of withdrawal of heated water from the tank upper portion and introduction of cold water to the tank lower portion.

Brief description of the drawing

The present invention is illustrated in the accompanying drawing wherein:

The figure of the drawing is a circuit diagram of the arrangement of the circuit means of the present invention for energizing heating elements of electric water heater and shows the physical location of the circuit components with respect to the water tank.

Description of the preferred embodiments

A vertically-arranged cylindrical water heater tank 10 having a domed top 11 and a concave bottom 12 is divided into three portions including lower portion 13 having a water inlet (not shown), an upper portion 14 having a water outlet (not shown) and an intermediate portion 15. For proper operation of the circuit arrangement of the present invention, it is necessary to locate the electrical circuit elements in a particular portion of the tank 10. A pair of electrical heating elements 16 and 17 are located in the tank lower portion 13. The heating elements 16 and 17 are typically sheathed waterproof electrical resistance heating elements placed within the tank 10 with their electrical connections extending through the sealed apertures in the tank wall. Four thermally responsive switches 18, 19, 20 and 21 are provided. Thermally responsive switch 18 is responsive to the temperature in the tank lower portion 13 and is of a single-throw type having a pair of normally closed contacts 22 and 23. Thermally responsive switch 19 is responsive to the temperature in the tank intermediate portion 15 and is of a double-throw type having a pair of normally closed contacts 24 and 25 and a pair of normally open contacts 26 and 27. Thermally responsive switches 20 and 21 are responsive to the temperature in the tank upper portion 14. Thermally responsive switch 20 is of a single-throw type having a pair of normally closed contacts 28 and 29. Thermally responsive switch 21 is of a double-throw type having a pair of normally closed contacts 30 and 31 and a pair of normally open contacts 32 and 33. One convenient location for the thermally responsive switches 18–21 is on the outer wall of the tank 10 in a heat transfer relationship with respect to the wall so as to be responsive to the temperature of the water within the tank.

The electrical heating elements 16 and 17 are energized through the four thermally responsive switches 18–21 from a power supply system which includes a first line 34 and a second line 35. A typical line voltage provided between the two lines 34 and 35 is 220 volts, as shown in the upper right hand portion of the figure.

The heating element 16 has a first terminal 36 and a second terminal 37. The other heating element 17 has a first terminal 38 and a second terminal 39.

The first terminal 36 of the heating element 16 is connected to the first line 34 by a conductor 40. The second terminal 37 of the heating element 16 is connected to one of the normally closed contacts 24 of the switch 19 by a conductor 41. The other normally closed contact 25 of the switch 19 is connected to the second line 35 by a conductor 42.

The first terminal 38 of the other heating element 17 is connected to one of the normally closed contacts 22 of the switch 18 by a conductor 43. The other normally closed contact 23 of the switch 18 is connected to one of the normally closed contacts 30 of the switch 21 by a conductor 44. The other normally closed contact 31 of the switch 21 is connected to the first line 34 by a conductor 45. The second terminal 39 of the heating element 17 is connected to one of the normally closed contacts 28 of the switch 20 by a conductor 46 and the other normally closed contact 29 of the switch 20 is connected to the second line 35 by a conductor 47.

One of the normally open contacts 26 of the switch 19 is connected to the conductor 41 by a conductor 48 and the other normally open contact 27 of the switch 19 is connected to the conductor 46 by a conductor 49.

One of the normally open contacts 32 of the switch 21 is connected to the conductor 44 by a conductor 50 and the other normally open contact 33 of the switch 21 is connected to the conductor 42 by a conductor 51.

The operation of the circuit means of the present invention will now be described assuming that the tank 10 has been filled with cold water. In such a condition, all four of the thermally responsive switches 18–21 will move to the positions indicated by the letters C in the figure. The letters C indicate the normal or cold positions of the thermally responsive switches 18–21. That is, the normally closed contacts 22 and 23 of the switch 18, 24 and 25 of the switch 19, 28 and 29 of the switch 20, and 30 and 31 of the switch 21 will be closed, and the normally open contacts 26 and 27 of the switch 19 and 32 and 33 of the switch 21 will be open. With all four of the switches 18–21 in their normal or cold positions C, the heating element 16 is connected across the power supply lines 34 and 35 through a first circuit which comprises the conductor 40, heating element 16, conductor 41, closed contacts 24 and 25 of the switch 19 and conductor 42. The second electrical heating element 17 is connected in parallel with the heating element 16 across the power lines 34 and 35 by a second circuit comprising the conductor 45, closed contacts 30 and 31 of the switch 21, conductor 44, closed contacts 22 and 23 of the switch 18, conductor 43, heating element 17, conductor 46, closed contacts 28 and 29 of the switch 20 and conductor 47.

The heating of the cold water within the tank 10 by the parallel heating elements 16 and 17 will result in heated water rising in the tank. The thermally responsive switches 18–21 are adjusted to move from their normal or cold positions indicated by the letters C to their actuated or hot positions indicated by the letters H at approximately the same predetermined water temperature. Since the natural convection of the water carries the warmer water to the tank upper portion 14, the water temperature in the tank upper portion 14 reaches the predetermined temperature before the water in the tank lower and intermediate portions 13 and 15. When the water in the tank upper portion 14 reaches the predetermined temperature, the switches 20 and 21 move to the positions indicated by the letter H. In this condition, the contacts 28 and 29 of the switch 20 are opened, contacts 30 and 31 of the switch 21 are opened and contacts 32 and 33 of the switch 21 are closed. The opening of the contacts 28 and 29 of the switch 20 and 30 and 31 of the switch 21 opens the second circuit and de-energizes the heating element 17. However, since water temperatures in the tank lower and intermediate portions 13 and 15 are still below the predetermined temperature, the contacts 24 and 25 of the switch 18 remain closed and the heating element 16 remains energized, being connected across the lines 34 and 35 through the first circuit.

As heating of the water within the tank is continued by the lone heating element 16, the water in the tank intermediate portion 15 will reach the predetermined temperature before the water in the tank lower portion 13. When the water in the tank intermediate portion 15 reaches the predetermined temperature, the switch 19 moves to the position indicated by the letter H, opening its normally closed contacts 24 and 25 and closing its normally open contacts 26 and 27. Since the water temperature in the tank lower portion is still below the predetermined temperature, normally closed contacts 22 and 23 of the switch 18 will remain closed. In this condition, both of the heating elements 16 and 17 will be energized, being connected in series across the power lines 34 and 35 through a third circuit comprising the conductor 40, heating element 16, conductor 41, conductor 48, now closed contacts 26 and 27 of the switch 19, conductor 49, conductor 46, heating element 17, conductor 43, closed contacts 22 and 23 of the switch 18, conductor 44, conductor 50, now closed contacts 32 and 33 of the switch 21, conductor 51 and conductor 42. The series-connected heating elements 16 and 17 will remain energized until the water in the tank lower portion 13 reaches the predetermined temperature and the switch 18 moves from its normally closed position, indicated by the letter C, to its actuated or hot position, indicated by the letter H, opening its contacts 22 and 23 to open the third circuit and de-energize both the heating elements 16 and 17.

When all three tank portions 13–15 are filled with hot water above the predetermined temperature, all of the four thermally responsive switches 18–21 will be in the position indicated by the letter H. Hence, there will be no connection of either of the heating elements 16–17 across the power lines 34 and 35 and both of the heating elements 16 and 17 will therefore be de-energizd.

During draw-off of hot water from the tank upper portion 14 through the outlet (not shown), cold water enters the tank lower portion 13 through the inlet (not shown). Therefore, during draw-off, the switch 18 is the first to return to its normal position, as indicated by the letter C. This recloses its contacts 22 and 23 and re-energizes the third circuit connecting the heating elements 16 and 17 in series across the power lines 34 and 35.

Continued draw-off of hot water from the tank 10 at a rate greater than the heat recovery provided by the series-connected heating elements 16 and 17 will cause the temperature in the tank intermediate portion 15 to drop below the predetermined temperature. This drop in tempearture will cause the switch 19 to return to its normal position, as indicated by the letter C. Normally open contacts 26 and 27 will be re-opened, breaking the series connection between the heating elements 16 and 17, and denergizing the heating element 17. However, the normally closed contacts 24 and 25 will be re-closed, thereby re-energizing the first circuit and connecting the heating element 16 alone across the power lines 34 and 35.

Continued draw-off of hot water from the tank 10 at a rate greater than the heat recovery provided by the enregization of the lone heating element 16 will cause the temperature in the tank upper portion 14 to drop below the predetermined temperature. This drop in temperature will cause the switches 20 and 21 to return to its normal positions, as indicated by the letter C, re-closing the normally closed contacts 28 and 29 of the switch 20 and 30 and 31 of the switch 21, and re-opening the normally open contacts 32 and 33 of the switch 21. When this occurs, the second circuit will also be re-energized and both of the heating elements 16 and 17 will be connected in parallel across the power lines 34 and 35 to provide maximum heat recovery. Thus, the circuit arrangement of the present invention provides three levels of recovery in an electric water heater provided with two electric heating elements.

Typically, the tank 10 has a rated capacity of 50 gallons of water, and the heating elements 16 and 17 are identical and rated to each provide 3,000 watts when energized at 220 volts. Therefore, on initial draw-off of hot water, with only the switch 18 positioned as indicated by the letter C and the other three switches 19–21 in the position indicated by the letter H, the heating elements 16 and 17 are connected in series across 220 volts and heat recovery is provided at the rate of 1,500 watts. With further draw-off at a rate faster than the heat recovery provided with two series-connected heating elements, the switch 19 will move from its hot to its cold or normal position thereby breaking the series connection between the heating elements, de-energizing the heating element 17 and energizing only heating element 16 across 220 volts. Under this condition the heating element 16 alone will provide 3,000 watts. Further draw-off of hot water at a rate faster than the heat recovery provided by the lone heating element 16, will cause the water temperature in the tank upper portion 14 to drop below the predetermined temperature, whereupon the switches 20 and 21 will move from their normal or cold positions to energize both of the heating elements 16 and 17 in parallel across the 220 volts and recovery will be provided at the rate of 6,000 watts.

The circuit means of the present invention also mitigate wearing of the heating elements 16 and 17 and the switches 18–21, since, in normal use, the bulk of their operation will be at the low recovery rate wherein the two heating elements 16 and 17 are connected in series across the power supply lines 34 and 35. Hence, the current carried by the heating elements 16 and 17 and switches 18–21 is usually only one-half that carried by them during the occasional periods of higher recovery rate operation.

As will be evident from the foregoing description, certain aspects of the present invention are not limited to the particular details of construction of the examples illustrated, and its is contemplated that various other modifications and applications would occur to those skilled in the art. It is therefore intended that the appended claims shall cover such modifications and applications as do not depart from the true spirit and scope of the invention.

What I claim as new and desire to secure by Letters Patent of the United States is:

1. In an electric water heater having an arrangement for energizing a pair of electrical resistance heating elements from a power supply which includes a first and a second line:
   (a) a water tank having a lower water inlet portion, an upper water outlet portion and an intermediate portion,
   (b) a pair of electrical resistance heating elements disposed within said tank lower portion,
   (c) first thermally responsive circuit means
       (i) responsive when water temperatures in all three of said tank portions are below an approximately identical predetermined temperature to connect said heating elements in parallel across the lines,
       (ii) responsive when water temperatures in all three of said tank portions are above said predetermined temperature to disconnect both said heating elements for across the lines, and
       (iii) responsive when water temperature in said tank upper portion is above and water temperature in said tank intermediate and lower portions are below said predetermined temperature to connect one of said heating elements across the lines and to disconnect the other of said heating elements across the lines, and
   (d) second thermally responsive circuit means responsive when water temperatures in said tank upper and intermediate portions are above and water temperature in said tank lower portion is below said predetermined temperature to connect said heating elements in series across the lines.

2. The invention of claim 1, wherein:
   (a) each of said heating elements has a first and a second terminal,
   (b) said first circuit means comprises a first and a second circuit,
   (c) said first circuit comprising
       (i) means for connecting said first terminal of said one heating element to the first line, and
       (ii) means for connecting and disconnecting said second terminal of said one heating element to and from the second line including a first thermally responsive switch that is of a double-throw type and is responsive to water temperature in said tank intermediate portion,
   (d) said second circuit comprising
       (i) means for connecting and disconnecting said first terminal of said other heating element to and from the first line including a second thermally responsive switch that is of a single-throw type and is responsive to water temperature in said tank lower portion and a third thermally responsive switch connected in series with said second switch, said third switch being of a double-throw type and responsive to water temperature in said tank upper portion, and
       (ii) means for connecting and disconnecting said second terminal of said other heating element to and from the second line including a fourth thermally responsive switch that is of a single-throw type and is responsive to water temperature in said tank upper portion, and
   (e) said second thermally responsive circuit means comprises a third circuit including said first switch for connecting and disconnecting said second terminals of said heating elements to and from one another.

3. The invention of claim 2, wherein:
   (a) said first thermally responsive switch is operative between a first position in which it connects said second terminal of said first heating element to the second line and disconnects said second terminals of said heating elements from one another when water temperature in said tank intermediate portion is below said predetermined temperature and a second position in which it disconnects said second terminal of said first heating element from said second line and connects said second terminals of said heating elements to one another when water temperature in said tank intermediate portion is above said predetermined temperature,
   (b) said second thermally responsive switch is closed when water temperature in said tank lower portion is below said predetermined temperature and opened when water temperature in said tank lower portion is above said predetermined temperature,
   (c) said third thermally responsive switch is operative between a first position in which it connects said second switch to said first line and disconnects said second switch from said second line when the water temperature in said tank upper portion is below said predetermined temperature and a second position in which it disconnects said second switch from said first line and connects said second switch to said second line when water temperature in said tank upper portion is above said predetermined temperature, and (d) said fourth thermally responsive switch is closed when water temperature in said tank upper portion is below said predetermined temperature and opened when water temperature in said tank upper portion is above said predetermined temperature.

References Cited

UNITED STATES PATENTS

| 2,312,772 | 3/1943 | Osterheld | 219—330 |
| 2,380,545 | 7/1945 | Pankow | 219—330 X |
| 3,352,999 | 11/1967 | Macoicz et al. | 219—321 |

ANTHONY BARTIS, *Primary Examiner.*

U.S. Cl. X.R.

219—330, 486